Figure 1:
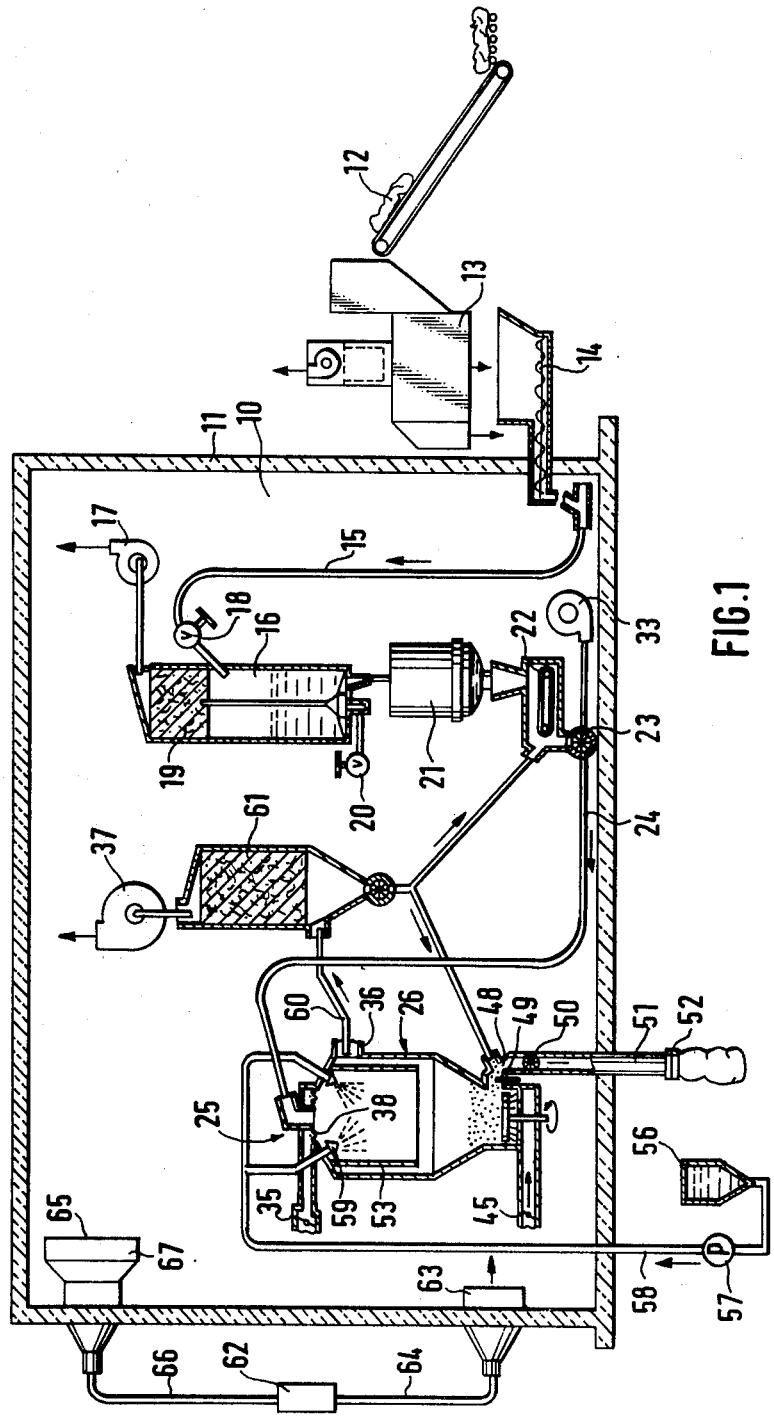

United States Patent [19]

Grun

[11] 4,141,316
[45] Feb. 27, 1979

[54] APPARATUS FOR THE TREATMENT OF POWDERY OR GRANULAR MATERIAL

[76] Inventor: Gustav Grun, Vogelsbergstr., 6474 Ortenberg 2, Fed. Rep. of Germany

[21] Appl. No.: 761,491

[22] Filed: Jan. 21, 1977

[30] Foreign Application Priority Data

Jan. 23, 1976 [DE] Fed. Rep. of Germany ....... 2602454

[51] Int. Cl.² .................. B05B 17/04; B05C 5/02; B01J 8/24; A23C 11/00
[52] U.S. Cl. ..................................... 118/303; 118/24; 118/DIG. 5; 426/453; 427/212
[58] Field of Search ............... 118/24, 303, DIG. 5; 427/212, 213, 220; 426/453

[56] References Cited

U.S. PATENT DOCUMENTS

| | | | |
|---|---|---|---|
| 2,561,394 | 7/1952 | Marshall | 427/213 |
| 2,799,241 | 7/1957 | Wurster | 118/24 |
| 3,040,439 | 6/1962 | Frost | 118/DIG. 5 |
| 3,110,626 | 11/1963 | Larson et al. | 118/24 X |
| 3,196,827 | 7/1965 | Wurster et al. | 118/24 |
| 3,385,724 | 5/1968 | Grun | 118/303 X |
| 3,469,562 | 9/1969 | Grun | 118/24 |

FOREIGN PATENT DOCUMENTS

| | | | |
|---|---|---|---|
| 696248 | 10/1964 | Canada | 427/213 |
| 1577656 | 8/1969 | France | 118/303 |
| 43-4482 | 2/1968 | Japan | 427/212 |

*Primary Examiner*—Robert Mackey
*Attorney, Agent, or Firm*—Friedman, Goodman & Teitelbaum

[57] ABSTRACT

An apparatus for the treatment of powdery and granular substances, which provides for cooling or heating and/or spraying the substances with liquid or molten addition or treatment elements in a vessel rotationally symmetrical to its vertical axis. The substances to be treated are introduced into a vortex flow at the head of the vessel and then carried along by a substantially axially parallel, downward-moving gas stream and are conducted through a spraying zone in which the liquid or molten elements are sprayed thereon. This flow, after a movement undisturbed over a certain interval, strikes upon a counterflow rising from underneath, the velocity adjustment of which is determined by the sifting effect and/or the staying time. The gases, preferably air, enter the vessel in a tempered state in correspondence to the desired result of the process.

7 Claims, 2 Drawing Figures

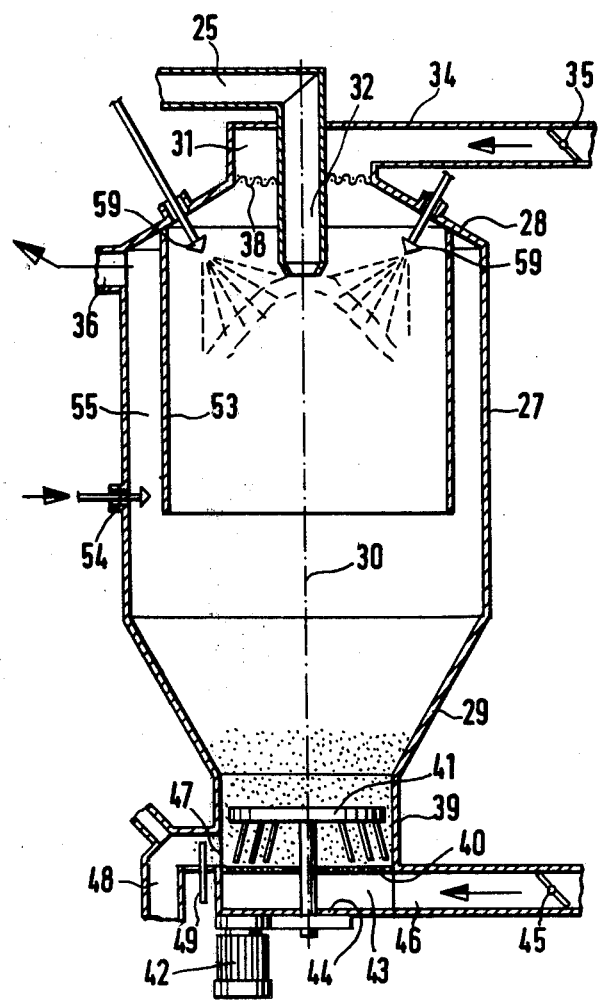

APPARATUS FOR THE TREATMENT OF POWDERY OR GRANULAR MATERIAL

The invention relates to an apparatus for the treatment of powdery or granular substances, namely cooling or heating and/or spraying with liquid or molten addition or treatment substances in a container rotationally symmetrical to the vertical axis.

Processes of this category are widely known and are described in prior art patents. They are used for the dry mixing of milk powder, starch, vitamin preparations, etc., for the depositing of fat on dry skim milk powder for the purpose of producing milk substitute feeds, and for the production of fat concentrates. During simultaneous cooling, fat is sprayed on the powder particles in order to obtain a fluid product with a fat constituent of more than 40%. For producing detergents by the cold spray process, wash-active substances are sprayed into a phosphate perborate mixture.

These known processes can be used both in conventional dry mixing apparatuses and also in other installations in which material clouds, rising in counterflow, are sprayed with liquid. They have, however, disadvantages. Thus in mechanical mixers, the material contained in them is heated by the mechanical mixing elements. The "leading off" of the heat is difficult. The disadvantages show themselves especially if the process requires a cooling, as is the case, as a rule, in the depositing of fats. The mixing in the fluid bed leads to a premature classification (sifting of heavier, lighter and unsprayed components). In a spraying treatment, there are accessible in each case only particles situated on the surface of the fluidized bed. No uniform spraying, therefore, is possible where the material separates; the spray nozzles can foul; and dust can cake on their openings.

The spraying, for example, of fat into the dry material is likewise known, but in the known devices particles that are not yet sprayed pass through the upward flow of the air into successive cyclone or filtering installations. If the material is cooled, then in the operation it is subjected to the cold air stream only for an extremely brief time. In order to achieve an additional staying time for the crystallizing out of the fat, additional construction elements are required, such as for example, whirlwind chutes or conveyor belts. Further disadvantages are the after-crystallizing of the product after it is packed.

The object of the invention is the obviation, avoidance or alleviation of the aforementioned disadvantages.

The process of the present invention for the treatment of powdery or granular substances, namely cooling or heating and/or spraying with liquid or molten addition or treatment substances in a container rotationally symmetrical to the vertical axis is distinguished in that the substances to be treated are introduced in a vortex flow rotating about the vertical axis, passing into the head of the container and then being carried along by a downward moving gas stream, substantially axially parallel, and then through a spraying zone in which the liquid or molten substances are sprayed on. This flow after a movement undisturbed over a certain interval strikes a counterflow rising from underneath, through whose velocity adjustment there is determined the sifting effect and/or the staying time. The gases entering the container are preferably tempered in correspondence to the desired course of the process.

In this new process, the spray application to the fed-in powder particles or granules is in an essentially quiet zone, namely in a zone in which these particles are sinking steadily downward. Through the vortex introduction, they are distributed over the cross section for their disposal, but then move downward in a uniform stream. They achieve this distribution over the cross section only underneath the nozzle scroll, so that they cannot clog the nozzle.

The apparatus of the present invention for the exercise of the new process, has a vertical, rotationally symmetrical container which has a vortex introduction device in the middle of the vessel head, and is distinguished by a gas entry opening uniformly surrounding the vortex inlet, for the introduction of a substantially axially parallel flow. An enlargement follows upon these two inlets over a short transitional interval in an axial direction downward, enlarging the vessel to a cylindrical chamber. A spray nozzle scroll is in the upper portion of the enlarged vessel section and on a diameter that is greater than the outer diameter of the gas entry opening. A constriction of conical form follows downward to a fluidized bed bottom closing off the vessel which is connected to the source supplying the counterflow. A gas outlet annular gap is provided above the conical constriction or in the zone of its upper edge.

The conduction of the gas streams of the process, preferably air streams, can easily be adjusted by choking devices in the inlets and the gas departure can be adjusted at the gas outlet annular gap. The flow in the vessel is preferably generated by a suction source at the gas outlet. A further peculiarity is the arrangement of the vessel in a space (chamber or hall) that is thermally insulated and accommodates the auxiliary assemblies which feed the previously described vessel, be it with gases (air) bringing about the movement, be it with the powdery or granular substances to be treated, or be it, if need be, with the liquid substances to be sprayed on. Undesired heat sources can, according to this invention, likewise be arranged outside this space as well as the device for tempering the treatment gas (air).

According to the new process there can be produced also readily soluble foods, for example, sugar, cocoa beverages, milk powder, baby foods, and also detergents and chemical products. The principle of this process can also be seen in that onto a dry material mixture that is centrally introduced to flow in the same direction, liquids are sprayed, in which process the mixture is uniformly distributed so that the finest particles by sticking together form a porous agglomerate. By flow in the same direction to the fed-in dry product, besides the dry product itself, there are conducted, on the one hand, the liquid to be sprayed on or a vapor to be supplied for the treatment and, on the other hand, if need be, hot air flowing through the sieve base and serving for the drying.

The so-called agglomerates formed in the free fall drop by their own weight to the lower sinter base and are there held in a state of vortex by hot air and dried. The agitating mechanism prevents caking on the bottom and a demixing. The hot air flowing in from above and also from below escapes through the annular gap to the filter. Through the conduction of the material in the mixing housing, it is achieved that the liquid (or vapor) to be sprayed in is completely absorbed by the dry material. Thereby, it is avoided that the afterengaged filter pockets stick to the liquid and become ineffective. The spray nozzle jets can first form in a space free of the dry product until there is a full development of a spray cone. The nozzles cannot jam through adhering powder particles and the liquid is distributed in extremely fine droplets uniformly in the dry material.

IN THE DRAWING

FIG. 1 illustrates the apparatus used in the present invention for the production of fat concentrate; and FIG. 2 illustrates an enlarged view of the mixer shown in FIG. 1.

The new process and the new apparatus are described below in an example of execution, namely in a process for the production of substances that contain a high constituent of added fat, or for the production of fat concentrates. The fat content of the concentrate thus designated may amount to more than 40%. The adding of smaller amounts of fat is then always possible.

The apparatus features are discussed simultaneously with the description of the process.

The apparatus or installation used for the production of the fat concentrate is that represented in FIG. 1. It contains several individual assemblies, the most important of which are housed in an insulated space 10. The insulation 11 of the space 10 is uniformly shaded or separated from heat sources. Since the most important sections of the treatment process are to proceed under lowered temperature and since for this cooling is required, heat sources, insofar as possible, are transferred from the interior of the space 10 to the outside. These are, in particular, the motors for the drive of the conveyor units such as pumps, blowers, cell-wheel sluices, conveyor worms, conveyor belts, liquid pumps and the like. An approximately equal effect is achieved, as likewise provided, by the use of hydraulic motors.

Let it be assumed that the substances to be treated, such as, for example, milk powder, starch, vitamin preparations etc., are already (more or less homogeneous) mixtures, which are ready in bags. Let a charge amount, for example, to 1 Mp [Megapond].

This material standing ready in bags 12 is conveyed over a bag-emptying arrangement 13, which separates the bag material from the filling material, and over a conveyor worm 14 into the cooling space 10 and there through a suction pneumatic system 15 into a so-called air mixer 16. The air required for the conveyance mentioned is drawn by a blower (fan) 17 from the space 10 and then together with the filling material through the conveyor line 15, designated as a pneumatic element, into the interior of the mixer 16 and, with separating off of the filling material, through the filter 19 present in the upper part of the mixer 16. On the pressure side of the blower 17 the conveyance air emerges freely into the cooling space 10. The filling material is retained in the mixer 16.

In the conveyor line 15, there lies a blocking valve 18 which is closed when this filling operation described is completed. The valve 20 is then opened for the feeding in of the mixing air. The blower 17 now sucks the air through the valve 20 instead of as before through the valve 18. The material contained in the mixer 16 is mixed and cooled by the air that flows in through the valve 20. The requisite mixing time amounts to about 2 minutes. With a performance of the installation of 1 Mp/hr, the size of the mixer can be laid out at about 500 kp, so that for the cooling of the filled-in material by the cooling stream, there are maximally available about 10 minutes. Through this duration of the mixing time and cooling time there can be achieved virtually any desired cooling effect. If need be, therefore, an extremely intensive cooling of the material to be sprayed can be effected. After completion of the mixing process, the material is let off into a supply container 21. Following upon this intermediate storer 21, there is a conveyor-type weigher 22 (see drawing), which is designed and laid out in such a way that it constantly delivers a set-in weight amount per time unit. It delivers the amount over a cell-wheel sluice 23 into a pressure conveyor line 24. This line 24 brings the material into an inlet cyclone 25 in the head of the spray mixer 26. The drive for the conveying air stream in the line 24 consists of a blower 33, from which there leaves the line 24. In this line, as shown, there lies the cell-wheel sluice 23 introducing the material to be treated from the conveyor-type weigher 22. The material streams are marked in the drawing by directional symbols (arrows).

The most important treatment steps are carried out in the spray mixer 26, into which, however, the material is introduced already in a homogeneous mixture and largely correctly tempered.

The mixer 26 consists of a sheet metal casing which preferably has the form shown in FIG. 2. The casing wall enclosing the hollow space of the mixer consists of a preferably cylindrical tube 27 of large diameter, whose upper end is closed off by a truncated-conical roof 28 with inlets (still to be described) and whose lower end likewise goes over into a truncated conical funnel 29. The opening angle of the roof-side truncated cone 28 is very large. The opening angle of the funnel cone 29 is governed according to the assignments of this funnel and is in general smaller than that of the roof.

The wall elements forming the housing of the mixer 26 are arranged rotationally symmetrically to a common straight axis 30, which is the axis of the elements 27, 28 and 29. An opening, disposed at the height of the smallest diameter of the truncated-conical upper covering 28, extends into a cylindrical part 31, likewise rotationally symmetrical to the axis 30. In the middle or center of part 31, there lies the tubular introduction end 32 of the cyclone introduction device 25. The axial height of the cylindrical part 31 as well as the other dimensions are governed, of course, according to the requirements of the user.

At the level of the boundary between the conical part 28 and the cylindrical part 31, there extends a perforated base 38 likewise crossed by the cyclone introduction tube 32. The cylindrical part 31 has an air feed opening or an air feed connecting piece 34. This air feed is provided with a regulating shutter 35. The interior of the casing of the mixer 26 is connected by a suction connecting piece 36 to a suction source in the form of a blower 37. This suction source 37 brings about that, with regulating shutter 35 open, air is drawn from this inlet 34 through the cylindrical part 31, and through the perforated base 38 which is positioned over the connection 36 to the blower 37.

The lower end of the funnel 29, situated in the lower part of the casing, goes over into a cylindrical part 39 (it is not especially mentioned here or necessary that all these parts are hollow parts consisting of sheet metal), whose lower end is closed off by a base 40 permeable to air. Over this base, there is an agitating mechanism 41, whose axis of rotation preferably coincides with the geometric axis 30 and which is driven by a gear motor 42 lying outside the housing of the mixer and extending through the air-permeable base 40. Under the air-permeable base, for example a sinter base 40, there lies an air feed chamber 43, the bottom 44 of which is simultaneously the bottom and closure of the entire mixer housing. This air feed chamber 43 has, on the side, an air inlet 46 and the entering air stream is controlled or regulated by a regulating shutter 45 lying in this inlet. A special feature lies in that the air, which is drawn into the inlets 46 and 34, is taken directly from the space 10.

Above the air-permeable base 40, there is in the cylinder or side wall of the casing section 39, a leaving or exit opening 47, to which there is connected a draw-off or run-out device 48. The run-off is provided with a regulating shutter 49. In the run-off itself, there is arranged a cell-wheel sluice 50, which dispenses the arriving product without it being possible for air to flow in the process through this sluice into the casing. A drop tube 51 leads the product through the cooling chamber boundary 11 to the packing station 52.

The cylindrical main portion of the casing contains a cylindrical inner wall 53 symmetrical to the axis 30, which is open underneath and has the top thereof tightly connected to the truncated-conical part 28; and whose diameter is smaller than the diameter of the cylinder shell 27 by enough so that the air, to be drawn off from the connection 36, can flow off through the cylindrical annular space formed between the sheet metal walls 53 and 27. In the cylinder wall 27, there is seated an additional air nozzle 54 that is directed in such a way that the air to be blown in enters tangentially into the annular space 55 between 27 and 53 and thereby converts the flow in this space into a vortex flow with the intended effect that solid particles flowing along with it pass to the outer wall and thereby are deposited downward onto the fluidized bed, which is situated over the air-permeable base 40. From these assignments, there is obtained the dimensions and the position of the individual elements; therefore, in particular, the place in which the nozzle 54 is situated, the height of the partition or apron 53 and the position of the suction connection 36. The latter is preferably arranged in the uppermost place in the annular space 55.

Let it be assumed, that the treatment of the starting material to be carried out in this installation consists in a spraying with a liquid. The liquid, which is to be added to the powdery or granular material introduced through the cyclone 25, is prepared or made ready in a container 56, and then by means of an apportioning pump 57, fed through lines 58 to spray nozzles 59. It may be expedient, as shown here, to keep the pump 57 and the supply container 56 outside the insulating space and to lead the line 58 through the insulation 11. In a radial direction, the nozzles 59 of the nozzle scroll lie inside the cylinder 53 and outside the outer edge of the perforated base 38. They lie, as far as possible, upward under the covering 28. The spray direction is directed downward and inward (to the axis 30).

In the connecting line 60 between the suction connecting piece 36 of the spray mixer 26 and the suction blower 37, there is installed a filter 61. The blower 37 is seated directly on this filter 61 and generates the required subpressure, to be regulated by the regulating shutters 45 and 35, in the mixer 26.

The described formation and dimensioning of the spray mixer is to be achieved in the following manner of functioning: The material fed in through the cyclone 25 into the spray mixer 26, is distributed uniformly in a vortex flow in the interior of the cylindrical shell 53, and additionally by the air that flows in over the inlet 34 and the perforated base 38 and is conducted downward. It falls onto the air-permeable sinter base 40, from where it is intimately mixed in a vortex flow by the air flowing in over the inlet 46, according to the amount. There, the agitating mechanism 41 prevents the arising of a sifting of the material on the fluidized layer bed. The air passes through the annular cylindrical gap 55, the outlet 36, the line 60 and the filter 61 to the blower 37.

Through the additional air nozzle 54, the upward-flowing air is forced into a winding movement inside the annular gap 55, so that solid particles flowing along pass onto the outer wall and are braked in the flow boundary layer or by friction on the wall itself, so that they fall down onto the fluidized bed. This process is promoted by the large area between inner shell 53 and outer shell 27 of the mixer 26 to a considerable extent, since there prevails a relatively low velocity of the upward-directed flow. In the space within the inner shell 53, through the formation and corresponding dimensioning of the air inlet chamber 31 and of the perforated base 38, there is prescribed a straight-line downward flow which carries along the solid particles. These particles, therefore, are brought by the cyclone or centrifugal action from the central tube 32 into the annular zone surrounding this tube underneath the perforated base 38 and there, in consequence of the downward-directed uniform flow from the chamber 31, are forced into parallel, substantially straight-line paths.

Into this descending material stream, the nozzles 59 of the nozzle scroll spray the liquid being applied. Since the nozzles 59 are seated high up under the ceiling 28, they are not reached by the solid particles introduced in the vortex flow. For this reason, there is precluded the danger of a fouling of the nozzles. The particles pass, however, directly under these spray nozzles and thereby into their zone of action, especially since the nozzles spray inward and downward. In this manner there is formed an agglomerate which arises, without mechanical strain, freely in the spraying space. Through this correspondingly tempered air flowing in both from above and from below, the product is brought to the correct temperature. This process can be a cooling or a heating process.

The staying time, which is the so-called "fattening up", is equal to the ripening time for the crystallizing out or drying, and can be shortened or lengthened at will by the regulating slide 49.

The special arrangement of the nozzles to a certain extent being in a dead angle where they cannot be reached by the introduced solid particles, makes it possible also for the spray jet to develop fully before it strikes the dry product set in vortex flow. Besides keeping the nozzles clean, there is further achieved a pre-cooling (if need be, also heating) of the finest liquid particles in the cold inflowing air.

The product retained by the automatic filter 61, which is self-cleaning, is supplied either to the run-out 48 or to the conveyor-type weigher 22, and therefore, returned into the material flow, so that there is no loss.

The cooling or heating air installation required for the process can be installed in such a way that for the cooling and heating exchanger on the wall of the space, the air is drawn off or blown in. The tempering device, in the present case, therefore, a cooling assembly 62 is situated outside the space 10. The air tempered by this assembly 62 is fed over the line string 64 to the air inlet 63 and there conducted into the space 10. The air leaves the space 10 again through the outlet 65, from where it returns through a changeable filter and the line 66 to the cooling assembly or heat exchanger 62.

Through the insulating of the entire space 10, there is eliminated the insulation of the individual assemblies. The air tempered by the assembly 62 can be taken at any place inside the space 10. The insulation of lines, therefore, is likewise dispensed with. According to one proposal of the invention, all the elements which disturb the desired temperature level inside the space are transferred outside. In the present case, in which a cooling is required, the motors for the drive of the blowers 17, 33 and 37 are outside the space 10. They are connected by means of corresponding mechanical lead-throughs to the working devices, here therefore, to the fans. Advantageously, the blowers and/or conveying arrangements are driven by hydraulic motors.

With use of a spray mixer with the essential features of the mixer represented, in a modified process, there was produced a milk substitute feed with very high fat content and an excellent fluidity in the following manner:

The milk powder was introduced by means of a cyclone, therefore a centrifuge in the upper part of the mixing vessel. Otherwise, than in the formation shown in FIG. 2, the powder was fed in from the side and left the cyclone in an upward direction. Thereby, the staying time and distribution were possible to improve, for the particles flung upward had to reverse their direction. Through the spray nozzles 59, the melted fat was sprayed in.

To a cell wheel sluice, there was connected a further fluidized bed for cooling, from which over a further cell wheel sluice, the finished material was drawn off. The cooling air was conducted in the following closed circulation: From a cooling installation, the cooled air was fed to the fluidized bed, where it fluidized the substantially finished material that had been dispensed from the mixer over the cell wheel sluice onto the fluidized bed. From there it was drawn off and supplied to a filter, from which it was drawn off by means of a fan and returned to the cooling installation.

While in the processes hitherto known, the droplets of melted fat dusted by powder were cooled as rapidly as possible, so that the fat crystallized as quickly as possible and was handleable, in the process to be described, the air determines the temperature in the mixer. Therefore, the temperature corresponds to the air feed at 35, 45 and 54 in the arrangement according to FIG. 2, and also the air supplied to the fluidized bed bottom were kept relatively warm. Instead of the usual cooling in known processes, here therefore, there was carried out a warming, and namely, in the temperature range between 0° C. and 100° C. The temperature range to be preferred lies between 15° and 60° C. Especially good results are yielded by a temperature range from 30° to 60° C.

The mixture treated also in the fluidized bed bottom with warm air shows after the end of the treatment, the structure of a coarse, fluid granulate, comparable with coarse gravel. After leaving the fluidized bed, the material, as mentioned above, was treated in an after-engaged cooling assembly in the form of a fluidized bed with cold air. The temperature of the cooling air is expediently regulated, and namely, in such a way that it can also be varied if need be, so that the temperature can be well adapted to the process.

The coarse, fluid material that occurs there, despite the high fat content, is almost heat-stable. It can be packed immediately in bags or containers. An after-ripening in the packed state no longer occurs. The wetability and solubility of this milk substitute feed is extremely good.

An especially favorable temperature range of the treatment warm air has proved to be the range from 30° to 60° C. The best results were achieved in the immediate vicinity of 50° C.

The prior described treatment process can be carried out advantageously in the above described apparatus. The turning away from the hitherto usual temperature treatment (cooling) and its replacement by heating, however, is also advantageous in conventional spray mixers into which the powdery material is introduced, sprayed with liquid fat and then subjected to a certain temperature treatment, if this temperature treatment in pursuance of the instructions given above is a heating in the temperature range mentioned. The relinquishment of cooling and rapid crystallization of the fat has as a consequence probably a better reciprocal penetration of fat and powder particles, which initially leads to an agglomeration of larger particles but could lead to the insulation of the larger particles from one another.

Since the process described requires two air streams of different temperature, with use of a thermally insulated space, expediently one of the two air streams is to be insulated inside the space; in the case described this is the cooling air stream.

Another process with use of the arrangement just described is in an application to the production of detergents, with excellent results. Detergent consists ordinarily of a dry substance, for example phosphate or perborate which is brought together with liquid detergent substances, but also enzymes, in the manner described. The dry substance, therefore, is introduced into the mixer in powdery form and then conducted through a zone in which it is sprayed with detergent-active substances and similar liquid substances. In the system just described, in which, however, the after-engaged fluidized bed was not used, it was possible for the products to be kept for a while in the fluidized bed bottom of the mixer, namely a period of time which was sufficient to allow the detergent to ripen. It was possible to pack it immediately after leaving the spray mixer. By maintaining a temperature range from 12° to 20° C., especially by maintaining a temperature within this range, there was obtained a washing powder of excellent consistency.

Since here the subsequent cooling in the fluidized bed is dispensed with, and on the other hand, the temperature range to be observed is narrow, it was especially advantageous to operate the apparatus in a space which was altogether at the desired treatment temperature. Within the indicated temperature range, the range from 14° C. to 17° C. was especially advantageous.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What I claim is:
1. Apparatus for use in treatment of powdery and granular substances comprising:

a vertical, rotationally symmetrical vessel with respect to its vertical axis, said vessel having a head portion;

a cylindrical wall being disposed in said vessel against said head portion and symmetrical with respect to said vertical axis, said cylindrical wall being spaced from inner side surfaces of said vessel to provide a larger inner chamber and a smaller annular outer chamber within said vessel;

vortex-introducing inlet means disposed in said head portion of said vessel and directed downwardly into said inner chamber for passing the substances into said inner chamber of said vessel in a vortex flow condition;

1 first gas inlet means directed downwardly into said inner chamber and disposed uniformly around said vortex-introducing inlet means for providing a substantially axially parallel flow of a downward-moving gas stream to carry the substances;

spray nozzle means disposed in said head portion within said inner chamber of said vessel for spraying the substances with liquid and molten material;

said inner chamber having a selected vertical length to allow the sprayed substances to be undisturbed for a preselected time interval;

said vessel having a conical lower portion disposed below said cylindrical wall for constriction of the sprayed substances downwardly toward a smaller bottom portion of said vessel;

fluidized layer bed means disposed between said conical lower portion and said bottom portion of said vessel for closing off downward movement of the sprayed substances to said bottom portion;

second gas inlet means directed upwardly through said bottom portion of said vessel and said bed means for delivering a counterflow of an upward-moving gas stream into said vessel;

said first and second gas inlet means being directed toward each other; and gas outlet means disposed within said outer chamber adjacent to said head portion of said vessel to provide an exit from said vessel for said counterflow of the upwardmoving gas stream.

2. Apparatus according to claim 1, wherein said first gas inlet means includes a perforated base member disposed in said head portion.

3. Apparatus according to claim 1, wherein said vortex introducing inlet means extends into said vessel in alignment with said vertical axis.

4. Apparatus according to claim 1, further including third gas inlet means disposed in a side wall of said vessel for tangentially blasting exiting gases to impart a twisting action to provide a separating effect.

5. Apparatus according to claim 1, including agitating means disposed above said bottom portion for acting on said sprayed substances.

6. Apparatus according to claim 1, wherein said vessel is disposed in a thermally insulated housing to provide a tempered space surrounding said vessel.

7. Apparatus according to claim 1, wherein said vortex introducing inlet means include a centrifuge cyclone device for introducing the substances into said vessel.

* * * * *